March 14, 1967    SUNAO OSAKADA ET AL    3,309,011

SEAL CONSTRUCTION FOR ROTARY COMBUSTION ENGINE

Filed Sept. 22, 1966

INVENTORS
SUNAO OSAKADA
TETSUO FUJIYAMA

BY Wenderoth, Lind & Ponack

ATTORNEYS

United States Patent Office 3,309,011
Patented Mar. 14, 1967

3,309,011
SEAL CONSTRUCTION FOR ROTARY COMBUSTION ENGINE
Sunao Osakada, and Tetsuo Fujiyama, Hiroshima-ken, Japan, assignors to Toyo Kogyo Company Limited, Hiroshima-ken, Japan
Filed Sept. 22, 1966, Ser. No. 581,362
Claims priority, application Japan, Sept. 22, 1965, 40/58,264
6 Claims. (Cl. 230—145)

This invention relates to improvements in sealing means for a rotary piston internal combustion engine which automatically maintains sealing contact with an adjacent member.

In general, rotary piston internal combustion engines comprise a housing having axially spaced parallel end walls having substantially flat internal surfaces and an annular casing having an epitrochoidal internal peripheral wall with two or more lobes between the end walls and defining a cavity therebetween. A rotary piston is journaled in the cavity on an eccentric portion of a shaft which is coaxial with the cavity and journaled in bearings in the end walls. The piston has substantially flat end faces disposed adjacent to the inner flat face of the end walls and has a peripheral surface with a plurality of circumferentially-spaced apex portions adapted for sealing engagement with the epitrochoidal internal wall of the annular casing to form a plurality of working chambers between the housing and the piston which vary in volume during the planetary motion of the piston as the shaft rotates. The piston end faces are ordinarily provided with annular grooves in which annular seals are inserted for sealing engagement with adjacent end wall inner faces for the purpose of preventing leakage of lubricating and/or cooling oil, or working fluid along the piston end faces. In order to assure the sealing engagement of the annular seals with the end wall inner faces, the seals are urged by spring means or the like in direction of the shaft and outward of the piston end faces.

In this type of seal construction, the springs act only axially outwardly urging the seals to seal tightly against the end wall inner faces, and do not produce an efficient sealing engagement with the side walls of the annular grooves in the piston end faces in which the seals are positioned. For the purpose of assuring sealing engagement between the annular groove side walls and the radially facing surfaces of the seals, the prior art has provided auxiliary sealing rings sealingly disposed between the annular groove side walls and sealing ring radial faces, thereby maintaining the sealing engagement of the seals against the annular groove side walls.

These auxiliary sealing rings, however, have introduced considerable friction drag on the seals in the annular grooves of the piston end faces, and this friction drag has hampererd sensitive minute axial movement of the seals in response to axial vibration or shock of the rotary piston and has resulted in poor sealing between the rotary piston end faces and the adjacent end wall inner faces.

An object of the present invention is to provide a rotary piston for a rotary combustion engine which has a simple and durable seal means between the piston end faces and the housing end wall inner faces to produce improved sealing of the working fluid and the lubrication and cooling oil.

More particularly, the present invention comprises a combination of elastic seal members which is elastically sealingly effective both in the radial direction against the housing end wall inner face and the axial direction against a radial side wall of the annular groove in the piston end face.

The present invention includes a pair of annular sealing members which are positioned in a rectangular cross section annular groove and have abutting tapered end faces forming a V-shape cross section annular groove therebetween, and an annular seal in the V-shaped groove which effects simultaneous radial sealing action against the housing end wall inner face and axial sealing action against a side wall of the annular groove in the piston end face.

Other and further objects and advantages will become apparent from the following detailed description and claims taken in conjunction with the accompanying drawings wherein:

Figure 1:
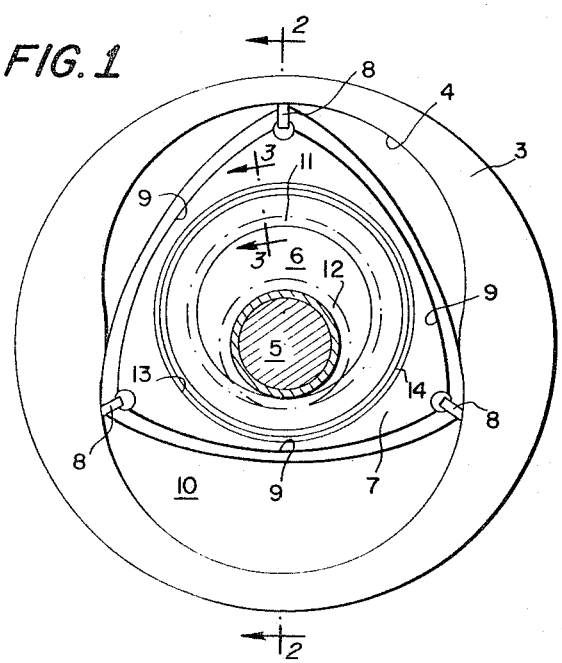
FIGURE 1 is a diagrammatic cross-sectional elevation view of a rotary piston internal combustion engine provided with the present invention, which view is taken along the line 1—1 of FIGURE 2.
Figure 2:
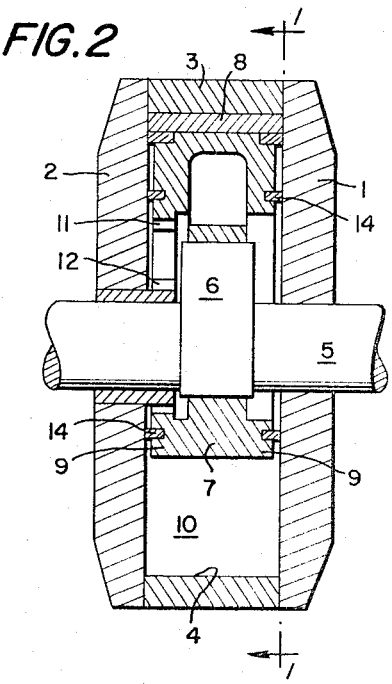
FIGURE 2 is a longitudinal sectional view of a rotary piston internal combustion engine, taken along the line 2—2 of FIGURE 1.

As shown in FIGURES 1 and 2, the rotary piston internal combustion engine comprises a housing composed of axially spaced end walls 1 and 2, both having substantially flat inner faces, and an annular center wall 3 disposed between and interconnecting said end walls to form a cavity therebetween. The inner surface 4 of the annular center wall 3 preferably has a multi-lobed cross-sectional profile which is basically an epitrochoid. A shaft 5 extends coaxially of the cavity defined by the housing and is journaled in bearings in the walls 1 and 2. Eccentrically disposed in the housing and journaled on an eccentric portion 6 of the shaft 5 is a rotary piston 7 having a plurality of circumferentially-spaced apex portions around its outer periphery. Each of said apex portions has radially movable apex seal means 8 which are in continuous sealing engagement with the center wall inner surface 4. The opposite ends of the rotary piston are substantially flat faces having side seal strips 9 extending between pairs of apex seals 8, and the side seal strips 9 sealingly engage the end walls 1 and 2 thereby forming, together with the apex seals 8, a plurality of working chambers 10 which vary in volume when the rotary piston 7 rotates within and relative to the housing. During the rotation of the piston 7 and the variation of the volume of the working chambers 10, the intake, compression, power and exhaust strokes are performed. Intake of combustible gas and exhausting of the products of combustion is carried out by means of conventional intake and exhaust ports (not shown). Coaxially secured to the rotary piston in an axial aperture or recess thereof is an internally toothed gear 11, which meshes with an external gear 12 coaxial with the shaft 5 and secured to one of the end walls for producing the relative motion of the rotary piston and the housing.

Radially inwardly spaced from the side seal strips 9 and opening outwardly on each end face of the piston 7 in the direction of the axis of the shaft 5 is an annular groove 13 in which the novel and improved seal construction to which the present invention is directed are disposed. As illustrated on an enlarged scale in FIGURE 3, an annular seal 14 which is substantially V-shaped in cross-section is disposed in the groove 13. The seal 14 has, when viewed in section, an axially outer annular leg 15 which has a radially inwardly and preferably sharpened sealing edge 16 provided on the radially inner end thereof. Opposed to the annular leg 16 and extending axially inwardly is an axially inner base 17 which, together with the annular leg 15, forms the axially flexible annular seal 14 which assures sealing contact of the sharpened edge 16 with the end wall inner face. Disposed adjacent the seal 14 and axially inwardly thereof in the groove 13 is an annular side seal 18, which is stretched by a spring means 19 in a radially outward direction so that it is sealingly engaged with a radially inwardly facing wall 20 of the groove 13. The side seal 18 can be composed of a thermostable rubber or like material which is lubricant and fuel-gas resistant so as to provide durable sealing in the high temperature conditions of the engine operation.

Disposed in the groove 13 and engaged by axially inner ends of the base 17 and the side seal 18 is an annular seat member 21, which is adapted to urge both the seal 14 and the side seal 18 in an axially outward direction as it is resiliently outwardly urged by a spring means 22 which is disposed between the seat member 21 and the bottom of the groove 13.

Continuous sealing engagement of the sharpened tip 16 is maintained by the elastic effect of the seal 14, side seal 18 and the spring means 22 which act together in an axial direction and urge the sharpened tip 16 into sealing contact with the end wall inner face. This elastic action in an axial direction produces forceful elastic engagement in the axially opposite end faces of the side seal 18 with the adjacent end faces of the seal 14 and the seat member 21. Due to this action, an axial stress is produced in the elastic side seal 18 and together with the action of the spring means 19, causes the said seal to stretch further in a radially outward direction, thereby improving the elastic sealing engagement of the side seal against the groove side wall 20.

The sharpened tip 16 is preferably of a harder and more wear-resistant material for improvement of the scraping action and durability. Gradual loss of radially and axially tight sealing contact between the side seal 18 and wall 20 of the groove due to deterioration of the elasticity of the side seal caused by its being subjected to high operating temperatures and repeating contact by the fuels, lubricants and cooling oil, will be compensated by the elastic effect of the spring means 19 and 22, together with axial flexibility of the seal 14.

Figure 3:
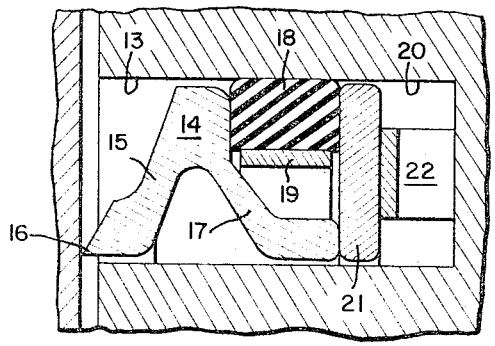
FIGURE 3 is an enlarged sectional view of a part of the engine of FIGURE 1, taken along the line 3—3 of FIGURE 1, and showing a detailed cross-section of the seal construction according to the invention.
Figure 4:
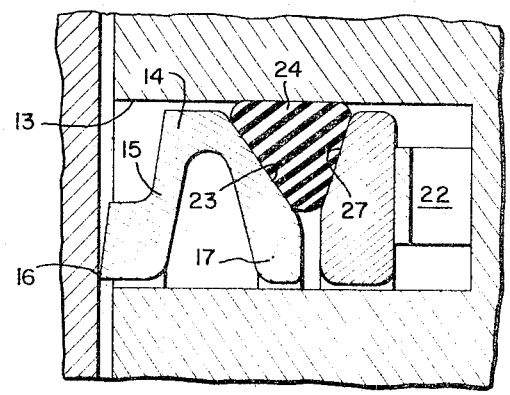
FIGURES 4 and 5 are enlarged sectional views, similar to FIGURE 3, and showing modifications of the seal construction according to the invention.

FIGURE 4 shows a different sealing structure wherein the seal 14 has a conical back wall 23, which facing in an axially inward direction on the inner base 17, to thereby form a radially outwardly facing V-shape cross-sectional groove between the seal 14 and a corresponding conical front wall 27 on the seat member 21. The side seal 24 is disposed between the conical walls 23 and 27 and the spring 19 of FIGURE 3 is omitted. The side seal 24 is urged axially by the spring means 22 and the seat member 21 and bears axially against the conical wall 23 of the inner base 17 so that a pressure acting on the side seal 24 effective to stretch the seal 24 in a radially outward direction is produced. The vector sum of the pressures on the seal maintains the sealing engagement of the side seal 24 with the conical wall 23 and the groove side wall 20.

Figure 5:
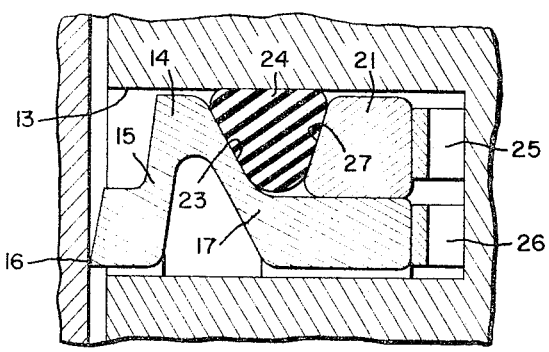

FIGURE 5 is similar to FIGURE 4 except that the seal 14 and the seat member 21 are separately supported by respective spring means 25 and 26, and the seal 14 and the side seal 24 are independently urged in an axially outward direction, so that the seal 14 is sensitive in its elastic response to axial vibration and shock of the piston 7. Also the force acting on the side seal 24 in the sealing direction can be varied by simply selecting the spring 25 according to the sort of material used for the side seal 24, so that this sealing contact force can be made any proportion of that of the seal tip 16 of the seal 14.

FIGURES 4 and 5 show a typical form of the side seal 24 which is trigonal in cross-section and is sealingly engaged at its trihedral plain surfaces with adjacent members. The present invention, however, is not limited to this specific form but various other forms are included in the appended claims. Also, although the side seals 18, 24 have been shown in the drawings as being a rubber-like material, the invention is not limited to seals of rubber or like materials, and in case metallic seals are employed, a leak-proof expansion joint (not shown) is provided to allow circumferential expansion thereof.

As illustrated in FIGURES 4 and 5, the direction of the force acting upon the side seal 24 for producing the sealing engagement thereof with the groove sidewall can be altered by providing an axially and radially outwardly facing conical wall 27 on the axially outward end of the seat member 21, so that the resultant force acting on the seal 24 will increase the sealing contact force against the side wall 20 of the groove 13.

The lubricant and the cooling oil flowing in the radially outward direction along the end wall inner face is scraped off by the sharpened sealing tip 16, and the leakage along the side wall of the annular groove 13 is blocked by the sealing engagement of the side seal, designated by reference numerals 18 and 21. The working fluid or gas leaking past the seal strips 9 is also blocked by the sealing engagement of the tip 16 and the side seals 18 and 21.

We claim:

1. An annular side seal construction for a rotary piston engine which engine has a housing of a rotary combustion engine which engine has a housing composed of spaced end walls, an annular center wall interconnecting the end wall to define a cavity therebetween, a rotary piston rotatably mounted within the said housing and having end faces disposed adjacent to said outer body end walls and having a peripheral surface cooperating with the peripheral wall of the housing to define a plurality of working chambers therebetween, the piston end faces each having an annular groove therein, said annular seal construction comprising an annular seal axially slidably received in said annular groove, said seal being elastic in the axial direction and having an annular sealing tip adapted for sealing engagement with the adjacent end wall inner face, a side seal sealingly engaged with a side wall of the said annular groove and the said annular seal, and a spring means disposed in the said annular groove and urging the side seal into sealing engagement with the said annular seal and the said annular seal into engagement with the adjacent end wall inner face.

2. A seal construction as claimed in claim 1 in which said annular seal is being substantially V-shaped in cross-section and has an axially flexible annular leg extending radially and partially axially toward the adjacent end wall, and has an axially flexible annular base unitary with the said leg and extending radially and partially axially toward the bottom of the annular groove and being engaged by the said spring means.

3. A seal construction as claimed in claim 1, in which the said side seal is being radially and elastically engaged against one of the radially facing side walls of the annular groove and axially sealingly engage with the said annular seal by the axial pressure of the said spring means.

4. A seal construction as claimed in claim 1 in which said annular seal has an axial inner conical end wall which faces partially axially inwardly and partially radially, and the said side seal engages said conical wall of the annular seal and the radially facing side wall of the annular groove and automatically sealingly engages with the said annular seal and the said annular groove side wall and urges the said annular seal towards the end wall when it is axially pressed by the said spring means.

5. A seal construction as claimed in claim 4, and an annular seat member disposed between the said side seal and the said spring means and the said annular seat member having a conical wall facing partially axially outwardly and partially radially and engaging and urging the said side seal partially axially and partially radially by the axial pressure of said spring means.

6. A seal construction as claimed in claim 4, in which said annular seal has an axial extension thereon, and a further spring means in the bottom of said groove and acting on said extension separately of said first mentioned spring means to improve the sealing engagement of each sealing element with the adjacent member.

References Cited by the Examiner

UNITED STATES PATENTS

| | | | |
|---|---|---|---|
| 342,721 | 5/1886 | Wood | 123—8 |
| 723,656 | 3/1903 | Dunn | 123—8 |
| 3,120,815 | 2/1964 | Froede | 230—145 |
| 3,134,600 | 5/1964 | Fisch | 123—8 |
| 3,139,233 | 6/1964 | Simonsen | 123—145 |
| 3,171,590 | 3/1965 | Bentele et al. | 230—145 |
| 3,180,563 | 4/1965 | Jones et al. | 230—145 |
| 3,193,188 | 7/1965 | Bentele | 103—126 |

DONLEY J. STOCKING, *Primary Examiner.*

W. J. GOODLIN, *Assistant Examiner.*